United States Patent
Lee et al.

(10) Patent No.: US 8,159,845 B2
(45) Date of Patent: Apr. 17, 2012

(54) CURRENT-SHARING POWER SUPPLY APPARATUS

(75) Inventors: Chung-Shu Lee, Taipei Hsien (TW); Shih-Chang Lee, Taipei Hsien (TW); Chien-An Chen, Taipei Hsien (TW); Jhe-Yu Lin, Taipei Hsien (TW)

(73) Assignee: Chicony Power Technology Co. Ltd., Taipei Hsien (TW)

( * ) Notice: Subject to any disclaimer, the term of this patent is extended or adjusted under 35 U.S.C. 154(b) by 293 days.

(21) Appl. No.: 12/720,906

(22) Filed: Mar. 10, 2010

(65) Prior Publication Data

US 2011/0222315 A1 Sep. 15, 2011

(51) Int. Cl.
*H02M 3/315* (2006.01)

(52) U.S. Cl. .............................. 363/71; 363/16; 323/267

(58) Field of Classification Search .............. 363/68–71, 363/16–17, 21.02–21.03, 131–132, 65; 323/267
See application file for complete search history.

(56) References Cited

U.S. PATENT DOCUMENTS 5,737,203 A * 4/1998 Barrett ............................ 363/75
7,696,733 B2 * 4/2010 Osaka ........................... 323/267

* cited by examiner

*Primary Examiner* — Harry Behm
(74) *Attorney, Agent, or Firm* — Chun-Ming Shih; HDLS IPR Services

(57) ABSTRACT

A current-sharing power supply apparatus is applied to regulate voltage level of an input DC voltage, and the regulated DC voltage is stabilized in a predetermined voltage to be used on rear-end circuits. The current-sharing power supply apparatus includes a square-wave generating circuit, a rectifier circuit, a conversion circuit, a rectifier circuit, a filter circuit, a first output terminal, and a second output terminal. The current-sharing power supply apparatus provides two output voltages with a multiple relation from the first output terminal and the second output terminal, respectively.

8 Claims, 4 Drawing Sheets

CURRENT-SHARING POWER SUPPLY APPARATUS

BACKGROUND OF THE INVENTION

1. Field of the Invention

The present invention relates to a power supply apparatus, and more particularly to a current-sharing power supply apparatus that can provide two output voltages with a multiple relation.

2. Description of Prior Art

In electronic engineering, a DC-to-DC converter is an electronic circuit which converts a source of direct current (DC) from one voltage level to another, and the converted DC voltage is stabilized at the preset voltage value. Generally speaking, the DC-to-DC converter is divided into two categories: one is "step-down" DC-to-DC converter (namely, the output voltage is lower than the input voltage), and the other one is "step-up" DC-to-DC converter (namely, the output voltage is higher than the input voltage). The DC-to-DC converter is mainly applied to a distributed power system. Hence, the DC voltage level of the previous stage is fixed, and the DC voltage level of the next stage can be connected to the corresponding DC-to-DC converter according to the required power.

The DC-to-DC converter is normally used to regulate voltage level of an input DC voltage to output a regulated voltage at an output terminal. For practical operation of the power supply, a proper amount of the DC-to-DC converters are essential to generate various voltage levels required to supply different circuits inside the power supply. However, both the costs and the volume of the power supply are increased.

SUMMARY OF THE INVENTION

In order to solve the above-mentioned problems, a current-sharing power supply apparatus is disclosed. The current-sharing power supply apparatus is applied to regulate voltage level of an input DC voltage, and the regulated DC voltage is stabilized in a predetermined voltage to be used on rear-end circuits. The current-sharing power supply apparatus includes a conversion circuit, a square-wave generating circuit, a resonant circuit, a rectifier circuit, a filter circuit, a first output terminal, and a second output terminal.

The conversion circuit has two transformers, and each of the transformers has a primary winding and a secondary winding. The secondary windings of the two transformers of the conversion circuit, which have a first secondary winding and a second secondary winding, respectively, are electrically connected in series. The square-wave generating circuit is electrically connected to the DC voltage. The resonant circuit is electrically connected to the square-wave generating circuit and has at least one first capacitor and the primary windings of the transformers of the conversion circuit.

The rectifier circuit is electrically connected to the secondary windings of the transformers of the conversion circuit. The filter circuit is electrically connected to the rectifier circuit and has at least one second capacitor. The first output terminal is electrically connected to a rear end of the filter circuit to output a filtered first output voltage. The second output terminal is electrically connected between the first secondary winding and the second secondary winding to output a second output voltage. The second output voltage is one half of the first output voltage.

In the present invention, the second output terminal is provided between the first secondary winding and the second secondary winding to output the second output voltage, which is one half of the first output voltage. Accordingly, the output voltages with a multiple relation are used without increasing any extra winding so as to reduce costs and increase significantly convenience of use.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
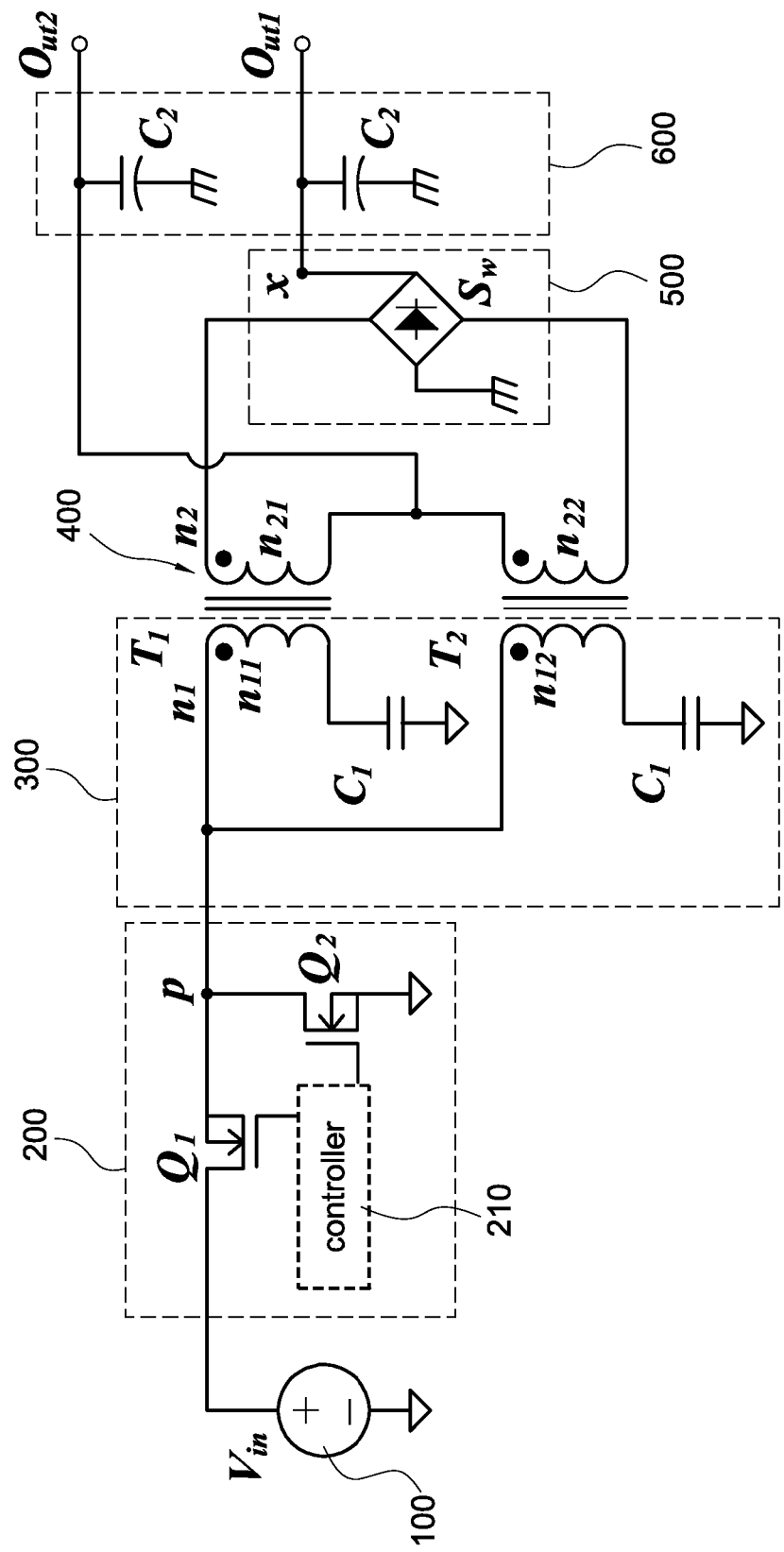
FIG. 1 is a circuit diagram of a first embodiment of a current-sharing power supply apparatus according to the present invention.

Reference will now be made to the drawing figures to describe the present invention in detail.

Reference is made to FIG. 1 which is a circuit diagram of a first embodiment of a current-sharing power supply apparatus according to the present invention. The current-sharing power supply apparatus is called a DC-to-DC converter, which is used to regulate voltage level of an input DC voltage 100, and the regulated DC voltage stabilized in a predetermined voltage. The current-sharing power supply apparatus includes a square-wave generating circuit 200, a resonant circuit 300, a conversion circuit 400, a rectifier circuit 500, and a filter circuit 600.

The conversion circuit 400 has two transformers, which are a first transformer T1 and a second transformer T2, respectively. Each of the transformers T1, T2 has a primary winding n1 and a secondary winding n2. More particularly, the left-side windings of the transformers T1, T2 are called the primary windings n1, and the right-side windings are called the secondary windings n2.

The first transformer T1 has a first primary winding n11 and a first secondary winding n21, and the second transformer T2 has a second primary winding n12 and a second secondary winding n22. Also, the first secondary winding n21 is electrically connected to the second secondary winding n22 in series.

The square-wave generating circuit 200 is electrically connected to the DC voltage 100 to switch the DC voltage 100 into a pulsating voltage. In this embodiment, the square-wave generating circuit 200 is a half-bridge square-wave generating circuit, which is composed of two semiconductor components, namely a first semiconductor component Q1 and a second semiconductor component Q2. The first semiconductor component Q1 and the second semiconductor component Q2 are controlled by a controller 210 to be alternately in a turned-on state and a turned-off state to generate a pulsating voltage Vp at a node p.

The resonant circuit 300 is electrically connected between the square-wave generating circuit 200 and the conversion circuit 400, and having two first capacitors C1 and the primary winding n1 of the conversion circuit 400. The first primary winding n11 is electrically connected to the second primary winding n12 in parallel. The two first capacitors C1 are electrically connected to the first primary winding n11 and the second primary winding n12 in series, respectively. More particularly, the first capacitors C1 are resonant capacitors, which are provided to filter the DC components of the pulsating voltage Vp. Besides, the AC components of the pulsating voltage Vp are resonated with the primary winding n1 of the conversion circuit 400 to generate a resonated voltage Vr which is conducted to the secondary winding n2 of the conversion circuit 400.

The rectifier circuit 500 is electrically connected to the secondary winding n2 of the conversion circuit 400, and having a full-bridge rectifier circuit which is composed of a plurality of rectifier devices Sw. Depending on unidirectional turned-on characteristics of the rectifier devices Sw, the rectifier circuit 500 rectifies the resonated voltage Vr to generate a rectified voltage Vx at a node x.

The filter circuit 600 is electrically connected to the rectifier circuit 500 and has two second capacitors C2. More particularly, each of the second capacitors C2 is a filter capacitor. Depending on charging and discharging characteristics of the second capacitors C2, the filter circuit 600 reduces voltage ripples of the rectified voltage Vx to output a first output voltage Vout1, which is smoother than the rectified voltage Vx, at a first output terminal Out1.

In addition, a second output terminal Out2 is electrically connected between the first secondary winding n21 and the second secondary winding n22 to output a second output voltage Vout2. The turns of the first secondary winding n21 can be assumed to equal to those of the second secondary winding n22. Because the second output terminal Out2 is exactly at the center of the secondary winding n2, the second output voltage Vout2 is one half of the first output voltage Vout1 (namely Vout2=0.5×Vout1). Accordingly, there is a multiple relation existed between the first output voltage Vout1 and the second output voltage Vout2 without increasing any extra winding.

Figure 2:
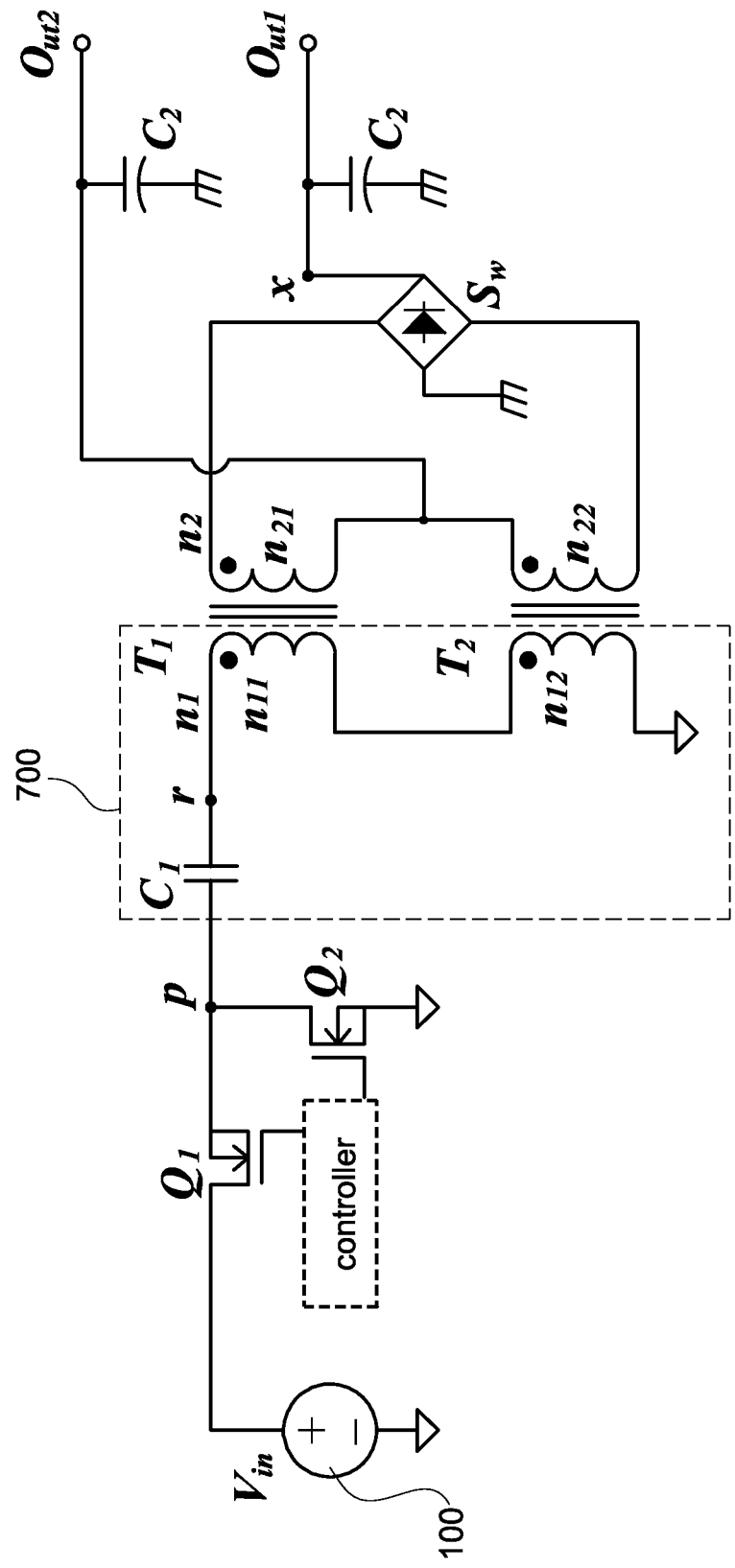
FIG. 2 is a circuit diagram of a second embodiment of the current-sharing power supply apparatus.

Reference is made to FIG. 2 which is a circuit diagram of a second embodiment of the current-sharing power supply apparatus. In this embodiment, the resonant circuit 300 in the first embodiment is replaced by another resonant circuit 700. The resonant circuit 700 has a first capacitor C1 and the primary winding n1 of the conversion circuit 400. The first capacitor C1 is electrically connected to the first primary winding n11 and the second primary winding n12 in series. More particularly, the first capacitor C1 is a resonant capacitor, which is provided to filter the DC components of the pulsating voltage Vp. Besides, the AC components of the pulsating voltage Vp are resonated with the primary winding n1 of the conversion circuit 400 (shown in FIG. 1) to generate a resonated voltage Vr at a node r.

Figure 3:
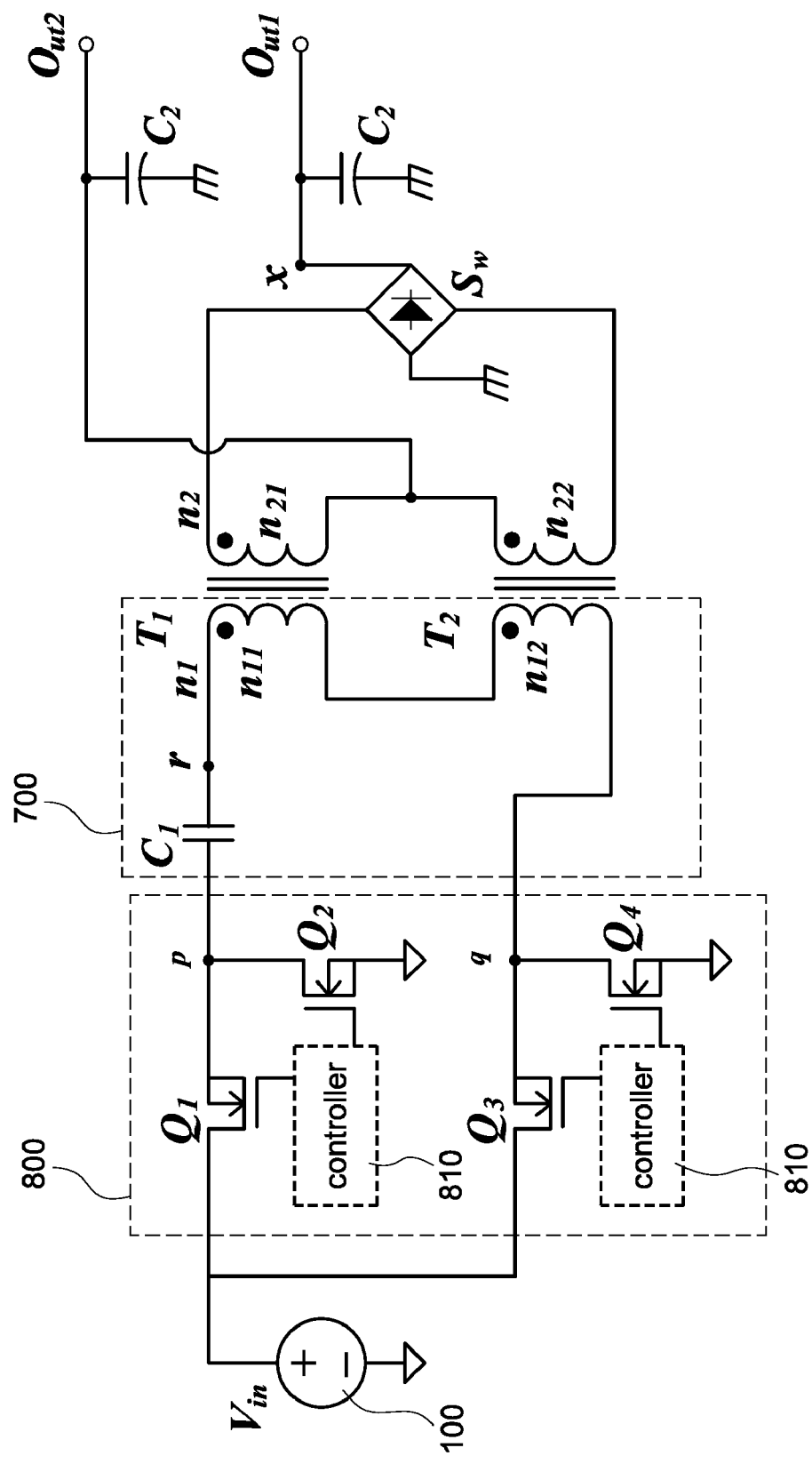
FIG. 3 is a circuit diagram of a third embodiment of the current-sharing power supply apparatus.

Reference is made to FIG. 3 which is a circuit diagram of a third embodiment of the current-sharing power supply apparatus. In this embodiment, the square-wave generating circuit 200 in the first embodiment is replaced by another square-wave generating circuit 800. The square-wave generating circuit 800 is a full-bridge square-wave generating circuit which is composed of four semiconductor components, namely a first semiconductor component Q1, a second semiconductor component Q2, a third semiconductor component Q3, and a fourth semiconductor component Q4. More particularly, the first semiconductor component Q1 is electrically connected to the second semiconductor component Q2, and to further electrically connect to a controller 810. Also, the third semiconductor component Q3 is electrically connected to the fourth semiconductor component Q4, and to further electrically connect to the controller 810. The four semiconductor components Q1-Q4 are controlled by the controller 810 to be alternately in a turned-on state and a turned-off state to generate two pulsating voltages Vp, Vq at a node p and a node q, respectively. Furthermore, for the full-bridge square-wave generating circuit 800, the resonant circuit 700 in the second embodiment is used to electrically connect to the square-wave generating circuit 800.

Figure 4:
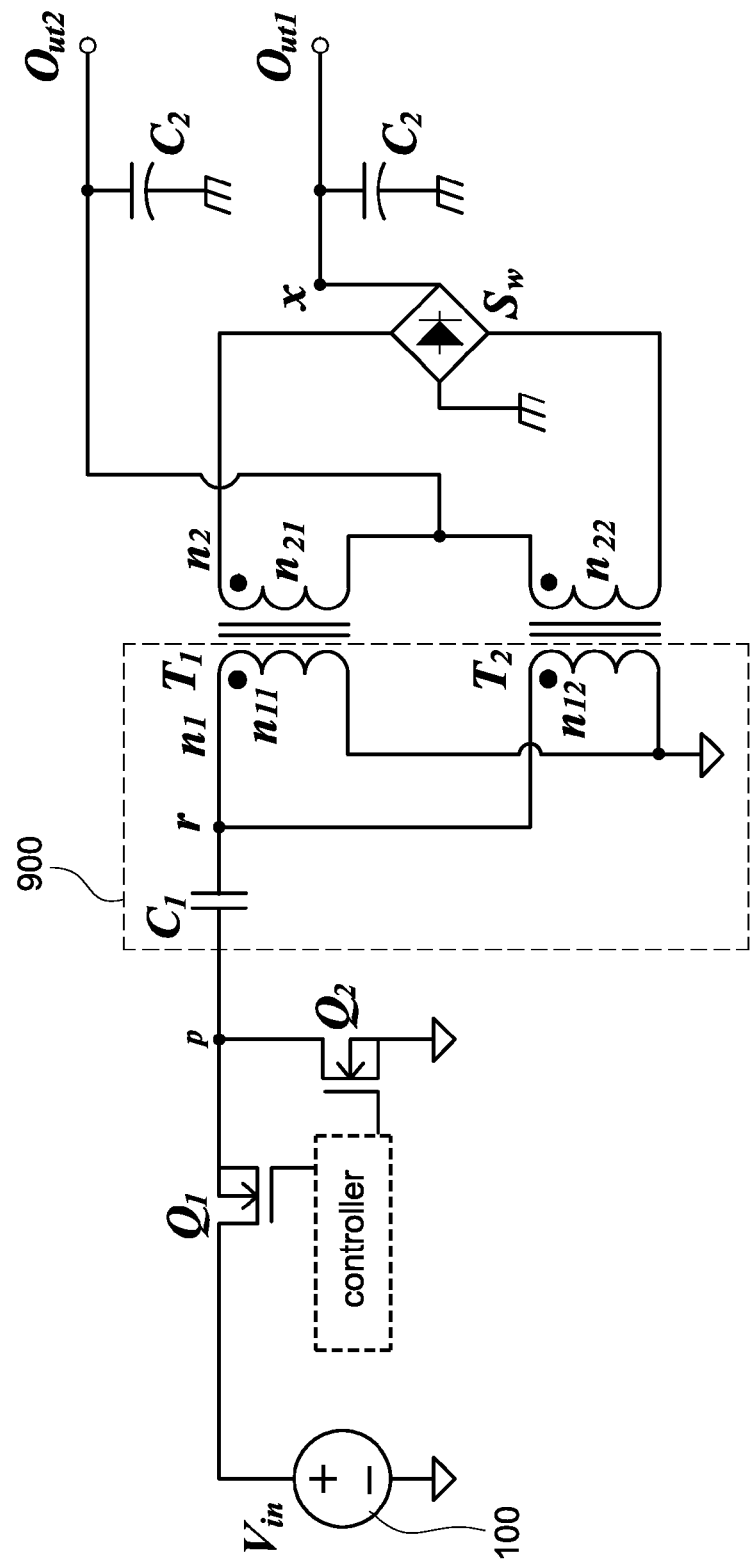
FIG. 4 is a circuit diagram of a fourth embodiment of the current-sharing power supply apparatus.

Reference is made to FIG. 4 which is a circuit diagram of a fourth embodiment of the current-sharing power supply apparatus. In this embodiment, the resonant circuit 300 in the first embodiment is replaced by another resonant circuit 900. The resonant circuit 900 has a first capacitor C1 and the primary winding n1 of the conversion circuit 400 (shown in FIG. 1). The first capacitor C1 is electrically connected to the primary winding n1 in series. The first primary winding n11 is electrically connected to the second primary winding n12 of the primary winding n1 in parallel. More particularly, the first capacitor C1 is a resonant capacitor, which is provided to filter the DC components of the pulsating voltage Vp. Besides, the AC components of the pulsating voltage Vp are resonated with the primary winding n1 of the conversion circuit 400 to generate a resonated voltage Vr at a node r.

In conclusion, because of a symmetric configuration of the secondary of the conversion circuit 400, the power supply apparatus with the first output terminal Out1 can provide a current-sharing function. In addition, the second output terminal Out2 is exactly at the center of the secondary winding n2 of the conversion circuit 400, the second output voltage Vout2 is one half of the first output voltage Vout1. Accordingly, the output voltages with a multiple relation are used without increasing any extra winding so as to reduce costs and increase significantly convenience of use.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A current-sharing power supply apparatus applied to regulate voltage level of an input DC voltage, the current-sharing power supply apparatus comprising:

a conversion circuit having two transformers, and each of the transformers having a primary winding and a secondary winding; wherein the secondary windings of the two transformers of the conversion circuit, which have a first secondary winding and a second secondary winding, respectively, are electrically connected in series;

a square-wave generating circuit electrically connected to the DC voltage;

a resonant circuit electrically connected to the square-wave generating circuit and having at least one first capacitor and the primary windings of the transformers of the conversion circuit;

a rectifier circuit electrically connected to the secondary windings of the transformers of the conversion circuit;

a filter circuit electrically connected to the rectifier circuit and having at least one second capacitor;

a first output terminal electrically connected to a rear end of the filter circuit to output a filtered first output voltage;

a second output terminal electrically connected between the first secondary winding and the second secondary winding to output a second output voltage; wherein the second output voltage is one half of the first output voltage.

2. The current-sharing power supply apparatus in claim 1, wherein the rectifier circuit is a full-wave rectifier circuit.

3. The current-sharing power supply apparatus in claim 1, wherein the square-wave generating circuit is a half-bridge circuit which is composed of two semiconductor components.

4. The current-sharing power supply apparatus in claim 1, wherein the square-wave generating circuit is a full-bridge square-wave generating circuit which is composed of four semiconductor components.

5. The current-sharing power supply apparatus in claim 1, wherein the first capacitor is a resonant capacitor.

6. The current-sharing power supply apparatus in claim 1, wherein the primary windings of the transformers of the conversion circuit are electrically connected in series.

7. The current-sharing power supply apparatus in claim 1, wherein the primary windings of the transformers of the conversion circuit are electrically connected in parallel.

8. The current-sharing power supply apparatus in claim 1, wherein the second capacitor is a filter capacitor.

* * * * *